(12) United States Patent
Bou-Ghannam et al.

(10) Patent No.: US 7,543,041 B2
(45) Date of Patent: Jun. 2, 2009

(54) PATTERN BASED WEB SERVICES USING CACHING

(75) Inventors: Akram A. Bou-Ghannam, Lake Worth, FL (US); Thomes E. Creamer, Boca Raton, FL (US); Victor S. Moore, Boynton Beach, FL (US); Scott L. Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1484 days.

(21) Appl. No.: 10/705,990

(22) Filed: Nov. 12, 2003

(65) Prior Publication Data

US 2005/0102392 A1 May 12, 2005

(51) Int. Cl.
*G06F 13/00* (2006.01)
(52) U.S. Cl. .................. 709/219; 709/224; 709/225
(58) Field of Classification Search ................ 709/217, 709/219, 223, 224, 225
See application file for complete search history.

(56) References Cited

U.S. PATENT DOCUMENTS

| 6,438,652 | B1 | 8/2002 | Jordan et al. |
| 6,675,261 | B2 * | 1/2004 | Shandony ............ 711/121 |
| 6,917,960 | B1 * | 7/2005 | Decasper et al. ........ 709/203 |
| 7,062,756 | B2 * | 6/2006 | Kamen et al. ............ 717/127 |
| 2002/0021665 | A1 | 2/2002 | Bhagavath et al. |
| 2002/0073167 | A1 * | 6/2002 | Powell et al. ............ 709/217 |
| 2002/0078190 | A1 | 6/2002 | Ullmann |
| 2002/0099593 | A1 | 7/2002 | Kraft et al. |
| 2002/0108102 | A1 | 8/2002 | Muhlestein et al. |
| 2002/0169870 | A1 | 11/2002 | Vosseler et al. |
| 2003/0033398 | A1 | 2/2003 | Carlson et al. |

OTHER PUBLICATIONS

"A Session Data Management Method for Web Applications", IBM Corp. Research Disclosure, No. 436, Art. 189, pp. 1502-1503, (Aug. 2000).

"Use of Virtual Local Area Networks In a Shared Infrastructure to Support Multiple Customers at Low Cost", IBM Res. Disc., No. 455, Art. 143, pp. 504-505, (Mar. 2002).

* cited by examiner

*Primary Examiner*—Viet Vu
(74) *Attorney, Agent, or Firm*—Novak Druce + Quigg

(57) ABSTRACT

A method of processing a request for a plurality of Web services can include storing, in a cache, a pattern object from a request for Web services and a list of watchers that invoked Web services responsive to detecting the pattern object. The method also can include receiving a new request for Web services specifying a new pattern object and determining whether the new pattern object matches the cached pattern object. If so, each watcher in the list of watchers can invoke an associated Web service. If no match with the cached pattern object is determined, each watcher can analyze the new pattern object, such that any watcher determining that the new pattern object matches a provisioned rule invokes an associated Web service.

3 Claims, 4 Drawing Sheets

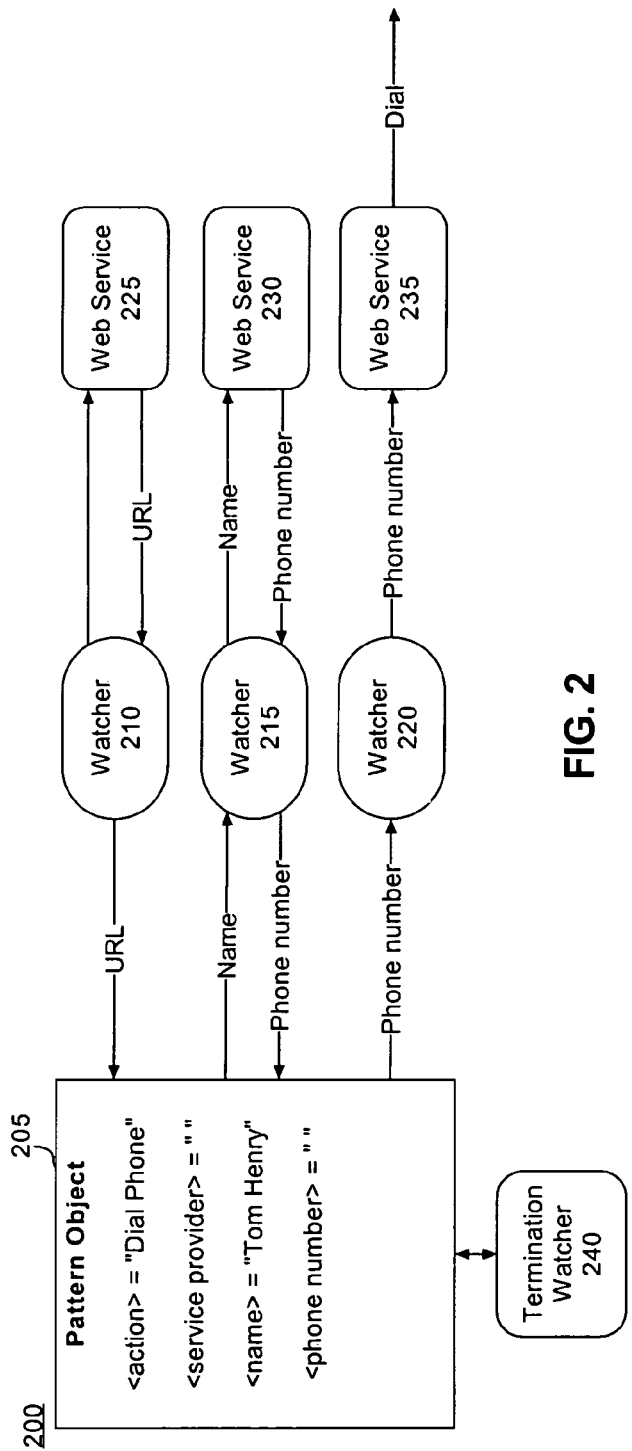

PATTERN BASED WEB SERVICES USING CACHING

BACKGROUND

1. Field of the Invention

The invention relates to the field of Web services and, more particularly, to invoking Web services using a pattern-based approach.

2. Description of the Related Art

Web services, also referred to as application services, are services that are made available from Web servers for Web users or other Web-connected applications. Providers of Web services generally are known as application service providers. Web services can range from such major services as storage management and customer relationship management to much more limited services such as the furnishing of a stock quote or the checking of bids for an auction item. Other examples of Web services can include, but are not limited to, services that provide a telephone number in response to a provided name and services that return one or more electronic mail addresses for a provided name.

Web services typically are request response based and follow the client/server model. That is, a request from a client is sent to a server for fulfillment. Typically, the request is provided to the server and is formatted according to Remote Procedure Call (RPC) protocol. In general, RPC enables one application, the client, to request a service from another application, the server. RPC allows the client, operating in one computer system, to issue the request to the server, operating in a different computer system within a network. The client application, need not have an understanding of the operational details of the network to make a request of the server application when using RPC.

The request can be sent using Simple Object Access Protocol. In other words, a SOAP message containing RPC information is sent to the server. The server can then process the received request and provide a response to the client. SOAP is a protocol that enables a program running in one kind of operating system to communicate with a program in the same or another kind of an operating system, and also computer system, by using the Hypertext Transfer Protocol (HTTP) and Extensible Markup Language (XML) as mechanisms for information exchange. SOAP specifies how to encode an HTTP header and an XML file so that a program in one computer can call a program in another computer as well as pass information.

Presently, the Web service paradigm specifies a procedure in which a request pertains to a single Web service. More particularly, each request initiates a single Web service and, therefore, is directed to a particular service provider. As such, to perform more complex actions involving more than one Web service, the client must issue a series of requests where each request is sent to a different Web service. That is, each constituent task of an action must be submitted to an appropriate Web service as a request.

If the tasks constituting the action are hierarchical in nature, such that one Web service requires information from another Web service to function, the requests must be issued to each Web service in proper order. In such cases, the client must receive a response from a given Web service so that the retrieved information can be used to build the request to be submitted to the next Web service in the hierarchy of Web services constituting the action to be performed.

SUMMARY OF THE INVENTION

The present invention provides a method, system, and apparatus for processing complex requests for Web services. According to the present invention, watchers analyze received pattern objects to determine whether to invoke a Web service associated with each watcher. Rather than have each watcher execute each time a pattern object is received, the present invention can include a cache for storing previously received pattern objects and a listing of the watchers that invoked Web services responsive to detecting each respective pattern object. By first consulting the cache and invoking any watchers corresponding to the received pattern object, the number of watchers that must analyze the received pattern object can be significantly reduced. That is, in the event of a hit, each watcher within the system need not analyze the pattern object. Instead, a listing of a limited number of watchers as specified by the cache can be executed.

One aspect of the present invention can include a method of processing a request for one or more Web services. The method can include storing, in a cache, at least one pattern object from a request for Web services and a list of watchers that invoke Web services responsive to detecting the pattern object, receiving a new request for Web services specifying a new pattern object, and determining whether the new pattern object matches the cached pattern object. If the new pattern object does match the cached pattern object, each watcher in the list of watchers can invoke an associated Web service. If not, each watcher in a system can analyze the new pattern object, such that any watcher determining that the new pattern object matches a provisioned rule invokes an associated Web service.

According to another embodiment of the present invention, the method can include storing in the cache the new pattern object and a list of watchers that invoked Web services responsive to detecting the new pattern object. The method further can include extracting the new pattern object from the request and storing the new pattern object in common memory prior to the determining step. Each of the watchers can be associated with a Web service and can specify a rule for invoking an associated one of the Web services. Each pattern object can specify more than one Web service to be performed. Each watcher can analyze the pattern object in parallel such that more than one Web service can be invoked concurrently. Still, two or more watchers also can invoke an associated one of the Web services sequentially.

Another aspect of the present invention can include a method of processing a request for two or more Web services including receiving a request specifying at least two Web services, storing a pattern object from the request in a common memory, and scanning the common memory with a plurality of watchers, wherein each watcher is associated with a Web service and specifies a rule for invoking an associated one of the Web services. The method also can include determining that the pattern object matches a rule of at least two of the watchers, such that each watcher having a rule matching the pattern object invokes an associated one of the Web services. A list of watchers that invoke an associated one of the Web services and the pattern object can be stored in a cache, such that the list of watchers is associated with the pattern object.

The method further can include receiving a new request including a new pattern object specifying more than one Web service to be performed and determining whether the new pattern object matches the cached pattern object. If a match is determined, each watcher in the list of watchers can invoke an associated Web service. If no match is found, each watcher in the entire system can analyze the new pattern object, such that any watcher determining that the new pattern object matches a provisioned rule invokes an associated Web service.

Another aspect of the present invention can include a system for processing complex requests for Web services. The system can include a Hypertext Transfer Protocol server configured to receive a single request for more than one Web service, at least one servlet configured to extract a pattern object from the request and to format a response to the request, a common memory that temporarily stores the pattern object while the Web services specified by the pattern object execute, and one or more watchers. Each watcher can be associated with a particular Web service and include a rule for invoking the associated Web service. Each of the watchers also can be configured to scan the common memory in parallel to determine whether a stored pattern object matches a rule for invoking an associated one of the Web services. The system also can include a termination watcher configured to detect termination criterion. The termination watcher can provide the pattern object back to one of the servlets to generate a response upon detecting the termination criterion. The system further can include a cache for storing pattern objects from requests and lists of watchers that invoked Web services responsive to detecting the pattern objects from the past requests.

According to another embodiment of the present invention, the system can include a cache logic for comparing pattern objects from received requests with cached pattern objects. The cache logic can be configured to cause each watcher in a list of watchers associated with a cached pattern object that matches the pattern object from a received request to invoke an associated Web service. If no match is determined between pattern objects from received requests and cached pattern objects, the cache logic can be configured to cause each watcher of the system to analyze the pattern object from the received request, such that any watcher determining that the pattern object from the received request matches a provisioned rule invokes an associated Web service.

The watchers can scan the common memory in parallel such that more than one Web service can execute concurrently. Still, the watchers can invoke more than one Web service sequentially. The watchers also can be configured to modify the pattern object according to instructions provided from an associated one of the Web services.

BRIEF DESCRIPTION OF THE DRAWINGS

There are shown in the drawings, embodiments which are presently preferred, it being understood, however, that the invention is not limited to the precise arrangements and instrumentalities shown.

FIG. 2 is a schematic diagram illustrating another aspect of a system for invoking pattern-based Web services in accordance with the inventive arrangements disclosed herein.

FIG. 3 is a schematic diagram illustrating a cache for use with the system of FIG. 1 in accordance with one embodiment of the inventive arrangements disclosed herein.

DETAILED DESCRIPTION OF THE INVENTION

Figure 1:
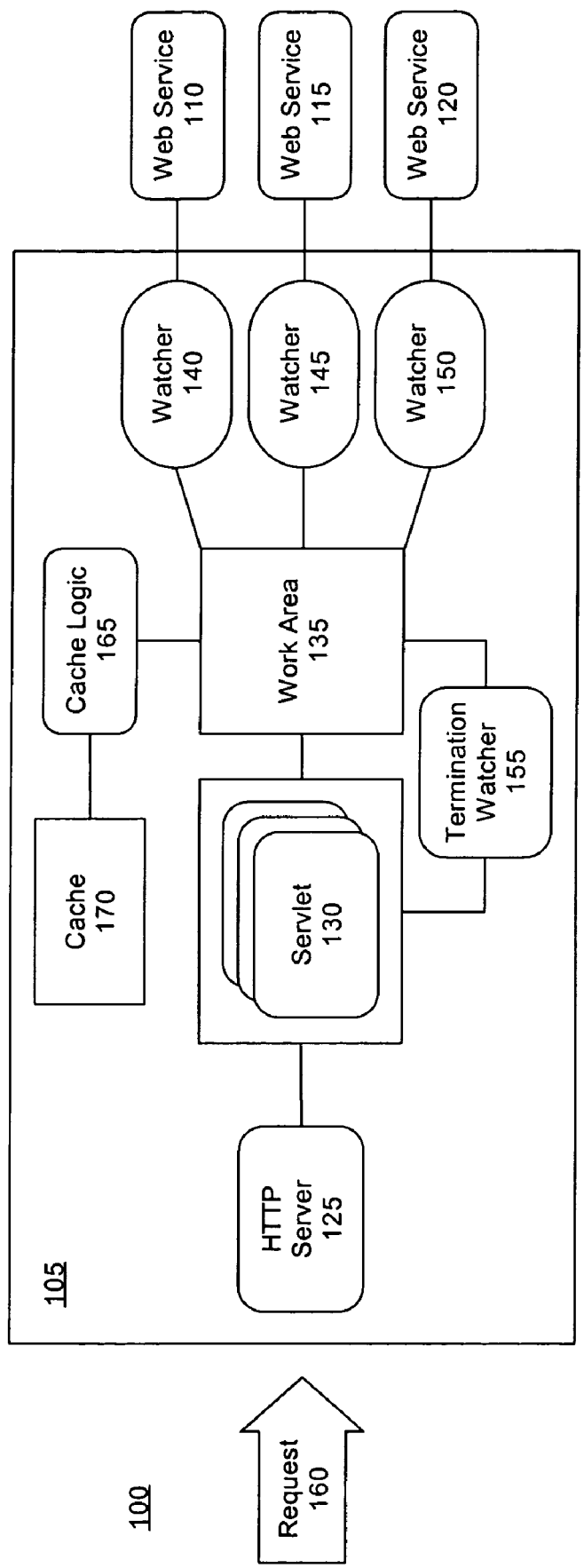
FIG. 1 is a schematic diagram illustrating a system for invoking pattern-based Web services in accordance with one aspect of the inventive arrangements disclosed herein.

FIG. 1 is a schematic diagram illustrating a system 100 for invoking pattern-based Web services in accordance with one aspect of the inventive arrangements disclosed herein. As shown, the system 100 can include a core server 105 and several Web services 110, 115, and 120.

The core server 105 can be implemented as a computer system or other information processing system including but not limited to a general purpose computer system and/or a server computer system. The core server 105 can include a Hypertext Transfer Protocol (HTTP) Server application 125 (hereafter HTTP server), a collection of one or more servlets 130, a common memory space 135, and one or more watchers 140, 145, and 150. A termination watcher 155, a cache 170, and cache logic 165 can be included as well.

The HTTP server 125 can receive requests 160 and send responses to received requests. The HTTP server 125, for example, can receive requests formatted according to Simple Object Access Protocol (SOAP), and decode such requests. Further, responses also can be formatted as SOAP responses. The servlets 130 can be configured to extract a pattern object from received requests. The pattern object can specify a name, a string of characters, a sequence of numbers, rules, another object, or any other structure that can be held by an object. The servlets 130 can extract pattern objects from received requests and place the pattern objects in the work area 135. The servlets 130 further can provision the termination watcher 155 to monitor the pattern object. When processing upon the pattern object is completed by the various Web services 110-120, the servlets 130 receive the pattern object, whether modified or in the same condition as originally extracted from the request 160, and formulate a response to be sent to the requester.

The work area 135 is a common memory space or portion of memory that can be used to store pattern objects extracted from received requests 160. The work area is accessible by each of the watchers 140, 145, and 150, the termination watcher 155, as well as the servlets 130. Watchers 140, 145, and 150 are software objects that can monitor or scan the work area 135. Each of the watchers is associated with a particular Web service as shown. Each watcher further can include one or more rules for determining when to invoke its associated Web service. The watchers 140-150 monitor the pattern object(s) placed in the work area 135. If a pattern object matches a rule specified within one of the watchers 140-150, that watcher invokes its associated Web service. While three watchers and corresponding Web services have been depicted, it should be appreciated that the core server 105 can include more watchers or fewer watchers depending upon the number of Web services that have been registered with the core server 105.

The termination watcher 155, like the other watchers 140-150, monitors the work area 135 for a pattern object that conforms or matches one or more rules within the termination watcher 155. The termination watcher 155 is provisioned by one of the servlets 130 when the pattern object is extracted and placed in the work area 135. When a pattern object is detected by the termination watcher 155 that conforms with one or more of the rules, the termination watcher 155 removes the pattern object from the work area 135 and returns the pattern object to the servlet 130 that originally extracted the pattern object from the received request.

While the termination watcher 155 can monitor for a pattern object of a particular format that matches the rules stored therein, the termination watcher 155 also can terminate the operation of one or more Web services by removing the pattern object from the work area after a detected fault, whether a time out condition or another fault. A time out condition, for example where the pattern object has been in the work area 135 for at least a predetermined amount of time, but does not conform to a rule within the termination watcher 155, can indicate that one or more of the Web services has not executed correctly or that some other fault condition has occurred.

The cache 170 can be a data store such as a portion of random access memory (RAM), disk storage, or the like. The cache 170 can be implemented as a physically separate data store. Alternatively, the cache 170 can be the same physical device as is already present in the core server 105, but logically separate.

The cache logic 165 can control when entries are written, removed, or overwritten in the cache 170. In addition, the cache logic 165 can monitor the work area 135 to determine when a pattern object has been added as a result of a request 160 being received and processed. The cache logic 165 can detect which watchers 140-150 invoke associated Web services 110-120 to process the pattern object. Accordingly, the cache logic 165 can store a copy of the pattern object in the cache as well as a list of each watcher 140-150 that invoked a Web service responsive to detecting the pattern object. It should be appreciated that the system 100 can include significantly more watchers and services than shown. Thus, the list of watchers that is stored in the cache 170 can be a limited set of the total watchers in the system. As such, the cache logic 165 can keep a record of received pattern objects and the watchers that invoked Web services responsive to detecting each respective pattern object for any number of received requests.

Each of the Web services 140-150, can perform a particular task such as locating a Universal Resource Locator (URL) for determining telephone numbers, determining an electronic mail address when provided with a name, or determining a telephone number when provided a name or an electronic mail address. Those skilled in the art will appreciate that Web services can perform any of a variety of different processing tasks. As such, it should be appreciated that the examples of Web services disclosed herein are not intended to be a limitation on the range of functions or tasks that can be implemented by Web services.

In operation, the HTTP server 125 can receive a request 160. The HTTP server 125 can route the received request 160 to an available servlet 130 for further processing. For example, the request 160 can specify a particular servlet 130 as determined from a Web Services Description Language (WSDL) file corresponding to the requested Web services. The servlet 130 that receives the request can extract or parse the pattern object from the request 160. The servlet 130 then can store the pattern object within the common memory 135.

Each of the watchers 140-150 can continually monitor the work area 135 for a pattern object. When pattern object(s) are detected, the watchers 140-150 check the pattern object(s) to determine whether the pattern object corresponds with one or more rules contained with the watchers 140-150. If a watcher determines that the pattern object matches one of its rules, that watcher can invoke the Web service that has been associated with that watcher.

While the watchers 140-150 can invoke Web services in sequential fashion, in another embodiment of the present invention, the watchers 140-150 can monitor for pattern objects within the work area 135 in parallel fashion and run concurrently with one another. Accordingly, Web services 110-120 also can be invoked in parallel fashion. Web services 110-120 can continue to operate until the termination watcher 155 detects a termination criterion. For example, detecting a termination criterion can include, but is not limited to, determining that one or more rules contained within the termination watcher 155 match the pattern object or detecting a fault such as a time out. At that time, the termination watcher 155 returns the pattern object to the servlet 130 that extracted the pattern object from the request 160. The servlet 130 then formulates a response that is sent to the requestor via the HTTP server 125.

A copy of the pattern object that has been placed in common memory also can be placed in the cache 170 by the cache logic 165. The cache logic 165 further can include a list specifying each watcher 140-150 that invoked a Web service responsive to detecting the now cached pattern object. For example, in one embodiment, a reference to each watcher having a rule that matched the cached pattern object can be placed in the cache 170 by the cache logic 165. Each list of watchers stored in the cache is associated with the stored pattern object that caused each watcher in the list to invoke its associated Web service.

Accordingly, when pattern objects have been extracted from subsequent requests, the cache logic 165 can compare the extracted pattern objects with the pattern objects stored in the cache 170. If a match is determined, then each watcher in the cached list associated with the matched, cached pattern object can be invoked, thereby causing the invocation of each Web service associated with a watcher in the cached list. If no matches are found within the cache 170, then all of the watchers 140-150 can begin execution to scan the pattern object in the work area 135 as previously discussed.

FIG. 2 is a schematic diagram illustrating another aspect of a system 200 for invoking pattern-based Web services in accordance with the inventive arrangements disclosed herein. As shown, system 200 illustrates the interaction of watchers 210, 215, and 220, the termination watcher 240, Web services 225, 230, and 235, and a pattern object 205.

The pattern object 205, as was described with reference to FIG. 1, is extracted from a received request by a servlet and stored in the work area. The pattern object specifies one or more tasks that must be performed to execute a more complex action. In this case, by way of example, the pattern object 205 pertains to telephony services. The pattern object specifies a "dial phone" action and provides a name of "Tom Henry". A service provider and a telephone number, however, are not specified in the pattern object 205. Accordingly, to execute the action of dialing a phone, one or more additional tasks, each performed by a particular Web service, must be performed.

In this example, Web service 225 can return a URL of another Web service that can dial a telephone number. Web service 230 can return a telephone number if provided a name. Web service 235 can dial a telephone number. As each Web service 225-235 is registered with the core server, a watcher is assigned to each Web service. Upon registration, each Web service provisions rules within the watcher associated with that Web service.

For instance, Web service 225, when registered with the core server can provision a rule within assigned watcher 210 which states that if a pattern object has a blank service provider attribute, watcher 210 will invoke Web service 225. As shown, Web service 225 determines a URL for the service provider attribute of the pattern object 205 and provides the URL to watcher 210. Watcher 210 then can modify the pattern object 205 by writing the URL to pattern object 205 while in the work area so that the service provider attribute specifies the URL determined by Web service 225.

When Web service 230 is registered with the core server, watcher 215 can be assigned. Web service 230 can provision a rule within watcher 215 which states that if the phone number attribute of the pattern object 205 is blank, and a name is available, then Web service 230 will be invoked. Accordingly, as shown, watcher 215 invokes Web service 230. Watcher 215 can provide Web service 230 with a name so that a phone number can be retrieved. Web service 215 provides the phone number to watcher 215, which writes the phone number to the pattern object 205 so that the phone number attribute specifies the phone number provided by Web service 230.

Watcher 220 can be associated with Web service 235 when registered with the core server. At that time, Web service 235 can provision a rule within watcher 220 which states that no action is to be taken until all of the attributes of the pattern object 205 have been completed. At that time, watcher 220 can invoke Web service 235. Accordingly, watcher 220 can provide the phone number to Web service 235, in addition to any other attributes that may be required, so that Web service 235 can dial the provided number.

From the example, it should be appreciated that the rules provisioned in the watchers 210-220 can be applied concurrently. Thus, each watcher can monitor the work area for one or more pattern objects that match the rules of each watcher. Each watcher that detects a match can invoke the associated Web service. For example, Web service 225 and Web service 230 can execute concurrently. After the phone number is dialed, watcher 220 can end or, alternatively, can modify the pattern object 205 by adding an identifier or some other reference prior to terminating execution. The termination watcher 240, which also monitors the pattern object 205 to determine when the pattern object 205 conforms with provisioned rules stored therein, can determine that the pattern object 205 now conforms with such rules. Accordingly, the termination watcher 240 can remove the pattern object 205 from the work area and return the pattern object 205 to the servlet 130.

In one embodiment of the present invention, the termination watcher 240 also can modify the pattern object 205 with an indication as to whether the Web services have executed properly or a fault has occurred. In another embodiment, the termination watcher 240 can simply return the pattern object 205 to the servlet and provide a separate notification as to whether the Web services were implemented correctly or a fault occurred.

FIG. 3 is a schematic diagram illustrating a cache 300 for use with the system of FIG. 1 in accordance with one embodiment of the inventive arrangements disclosed herein. The cache 300, as noted, can include pattern objects, or copies of pattern objects, that were extracted from received requests. Each cached pattern object can be associated with the watchers that invoked Web services responsive to detecting the pattern object in the common memory.

In illustration, pattern object 1 is a copy of a pattern object that has been extracted from a received request and stored in the cache 300. As shown, references to watcher 1, watcher 2, and watcher 3 each have been associated with pattern object 1 as watcher 1, watcher 2, and watcher 3 each invoked associated Web services responsive to determining that pattern object 1, when placed in the work area, matched a provisioned rule specified within each watcher.

Similarly, a reference to watcher 4, watcher 5, and watcher 6 has been stored in the cache 300. Each reference has been associated with a cached copy of pattern object 2, indicating that watcher 4, watcher 5, and watcher 6 each invoked an associated Web service responsive to detecting pattern object 2 in the work area.

It should be appreciated that the cache 300 has been shown for purposes of illustration only. As such, the examples discussed herein are not intended as a limitation of the present invention. Rather, the cache 300 can be implemented using any suitable caching technique. For instance, entries in the cache 300 can be stored in any of a variety of different arrangements, whether as a series of discrete entries, as lists of watchers, as groups of related references to watchers, or the like.

Further, the cache 300 can be implemented as any of a variety of different cache types. For example, the cache 300 can be implemented as a circular cache wherein entries are overwritten when no further space is available. In another embodiment, the cache 300 can store copies of pattern objects and lists of watchers or associated references to watchers for a predetermined number of received pattern objects or requests. After the predetermined number of requests have been received, aged cache entries can be removed. In still another embodiment, entries in the cache can be purged after a predetermined amount of time, despite whether the entry has been accessed.

Figure 4:
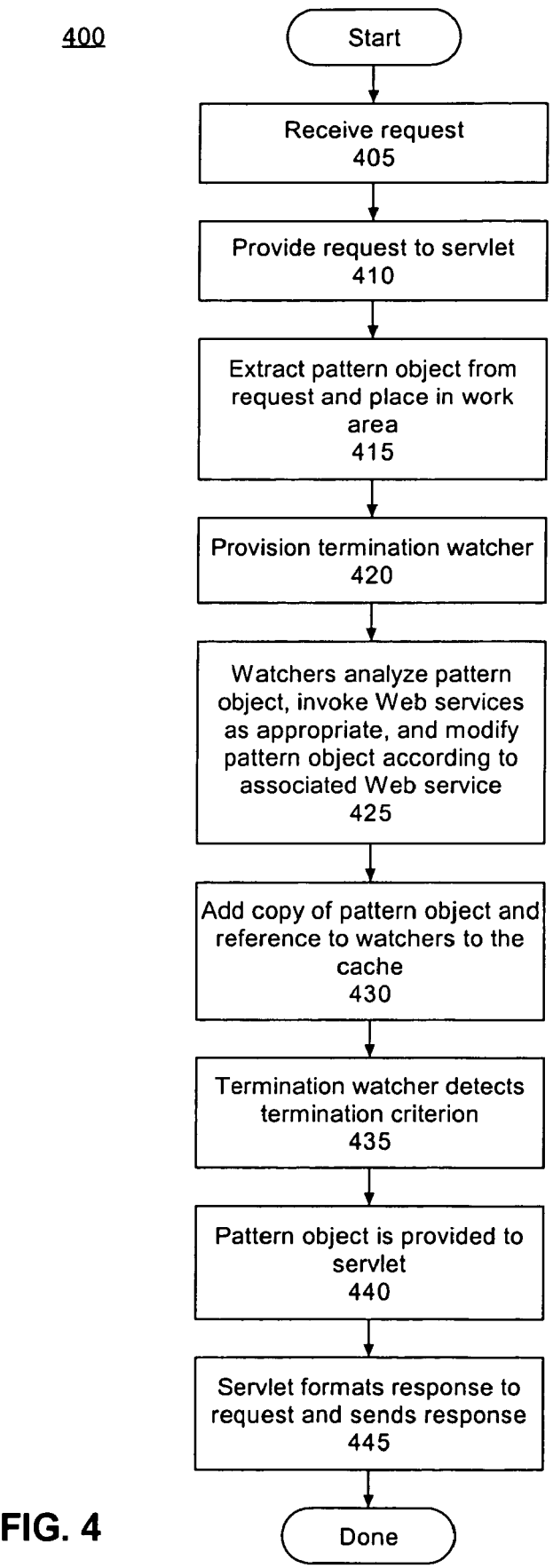
FIG. 4 is a flow chart illustrating a method of processing complex requests for Web services in accordance with another aspect of the present invention.

FIG. 4 is a flow chart illustrating a method 400 for processing complex requests for Web services in accordance with another aspect of the present invention. The method can begin in a state where one or more Web services have been registered with the core server. Accordingly, each Web service can be associated with a watcher. That is, a watcher can be instantiated for each Web service registered with the core server. Each Web service further can provision one or more rules within each associated watcher as specified within each Web service.

In step 405, a request such as a SOAP request can be received by the HTTP server disposed within the core server. The HTTP server can select an available one of the servlets and forward the request to the selected servlet in step 410. In step 415, the servlet can receive and process the request. More particularly, the servlet can extract a pattern object from the received request and store the pattern object in the work area. As noted, the pattern object can specify one or more services to be invoked, thereby enabling the initiation of more than one Web service via a single request.

In step 420, the servlet can provision one or more rules within the termination watcher. It should be appreciated that the request or the pattern object itself can specify the termination rules to be provisioned and applied with respect to the termination watcher. Accordingly, if so configured, each request can provision one or more different termination rules which specify different conditions for detecting the completion of execution of the combination of Web services specified by the pattern object as well as different faults which also can vary with the combination of Web service specified by the pattern object.

In step 425, once the termination watcher has been provisioned and the pattern object has been placed in the work area, the watchers can begin analyzing the pattern object. As noted, the watchers can monitor the pattern object in parallel and invoke Web services as appropriate when the pattern object is determined to match a rule of one or more of the watchers. Accordingly, the Web services can operate sequentially, concurrently, or both sequentially and concurrently as invoked by the watchers. The watchers also can modify the pattern object according to the Web service associated with each watcher.

Thus, for example, a second watcher can determine that the pattern object matches a rule stored therein after the pattern object has been modified by a first watcher responsive to the execution of the Web service associated with the first watcher. It should be appreciated that as each watcher can monitor the pattern object concurrently and modify the pattern object, a chain Web services can be invoked to operate concurrently, serially, or both concurrently and serially as the pattern object continues to be modified by watchers. In step 430, the cache logic can add to the cache a copy of the pattern object and an associated list of watchers that invoked a Web service responsive to detecting the pattern object in the work area.

In step 435, the termination watcher can detect a termination criterion. More particularly, the termination watcher can determine that the pattern object matches a rule for termination or determine that a fault has occurred. In either case, the termination watcher can remove the pattern object from the work area, whether the pattern object has been modified or is in the same condition as when initially placed in the work area. In step 440, the termination watcher can provide the pattern object to the same servlet that extracted the pattern object. As noted, the termination watcher can inform the servlet of the status of the execution of the Web services by indicating that the Web services have executed successfully or that a fault occurred. This information can be included within a message to the servlet or can be included within the pattern object itself.

In step 445, the servlet can build a response to be sent to the requestor. The response can include the pattern object, whether in its original or modified form. The response also can specify whether the Web services executed successfully or a fault occurred, for example whether a time out or another execution error occurred. This information can be included within the response by either including the information within some portion of the response itself or including the information within the pattern object as previously discussed.

Figure 5:
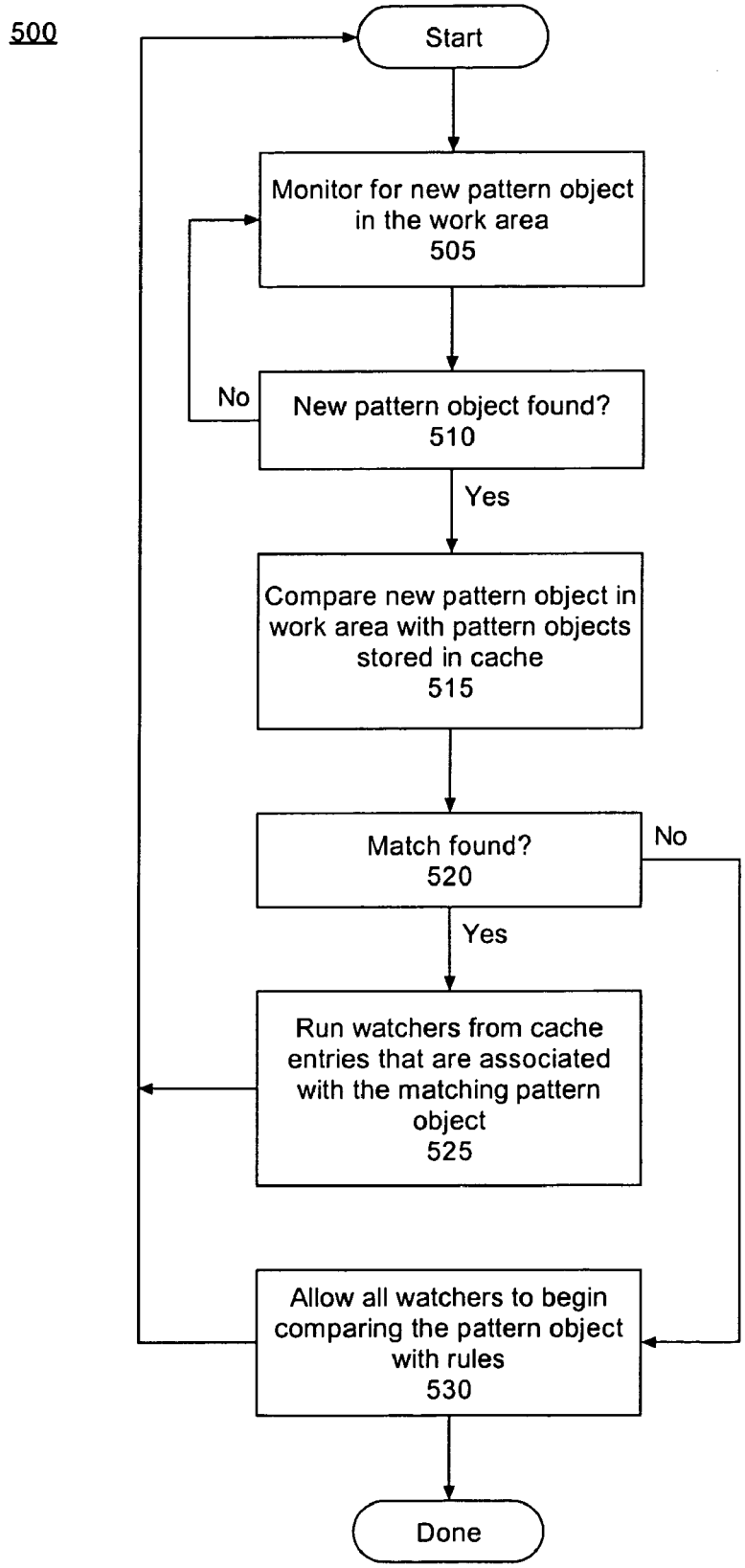
FIG. 5 is a flow chart illustrating a method of processing complex requests in accordance with another embodiment of the inventive arrangements disclosed herein.

FIG. 5 is a flow chart illustrating a method 500 of processing complex requests in accordance with another embodiment of the inventive arrangements disclosed herein. The method 500 can begin in a state wherein one or more copies of pattern objects and corresponding lists of watchers have been included or added to the cache.

In step 505, the cache logic can begin monitoring the work area for the addition of a new pattern object, for example responsive to a request being received by the core server. In step 510, if a new pattern object is found, the method can proceed to step 515. If not, the method can loop back to step 505 to continue monitoring for the addition of a new pattern object to the work area.

In step 515, the cache logic can compare the new pattern object in the work area with pattern objects stored in the cache to determine whether a match exists. If a match is found in step 520, the method can proceed to step 525. If no match is found, the method can continue to step 530.

Continuing with step 525, the watchers specified in the list that is associated with the matched pattern object from the cache can be executed. That is, the watchers that are represented by the list stored in the cache that is associated with the cached pattern object that is matched with the new pattern object stored in the work area can be identified. Those watchers can be run using the cached references. Rather than have each watcher in the entire system analyze the new pattern object, the operation of the core server and invocation of Web services can be expedited by first checking the cache and executing watchers known to be associated with the newly received pattern object. After step 525, the method can repeat as necessary to continue monitoring for new pattern objects.

In step 530, in the case where the new pattern object does not match an entry in the cache, each of the watchers of the system can begin analyzing the new pattern object. Each watcher can begin comparing the new pattern object with the provisioned rules within each watcher to invoke Web services as described herein. The method can repeat as necessary to process further pattern objects and requests. As noted, the cache can be cleared from time to time, on a periodic basis, for example after a predetermined amount of time, or can be overwritten when space is unavailable.

It should be appreciated that the methods described herein have been provided for purposes of illustration only. As such, those skilled in the art will recognize that the ordering of various steps can be altered without departing from the spirit of the present invention.

The present invention provides a solution for implementing a plurality of Web services responsive to a single complex request. As more than one Web service can be specified, rather than each watcher of a system processing a received pattern object, a cache can be consulted to first determine whether a smaller subset of the total number of watchers in the system can be identified and used to process the pattern object. If a hit is detected, the number of watchers that must analyze the pattern object is significantly reduced as compared with the total number of watchers in the core server.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of processing a request for a plurality of Web services comprising the steps of:

storing, in a cache, a pattern object from a request for Web services and a list of watchers that invoked Web services responsive to detecting the pattern object;

receiving a new request for Web services specifying a new pattern object and extracting the new pattern object from the request and storing the new pattern object in common memory prior;

determining whether the new pattern object matches the cached pattern object, wherein the determining is performed after extracting the new pattern object;

if so, causing each watcher in the list of watchers to invoke an associated Web service; and if not, causing each watcher in a system to analyze the new pattern object, such that any watcher determining that the new pattern object matches a provisioned rule invokes an associated Web service;

wherein each watcher is associated with a Web service and specifies a rule for invoking an associated one of the Web services;

wherein each watcher analyzes the pattern object in parallel such that more than one Web service can be invoked concurrently.

2. A method of processing a request for a plurality of Web services comprising the steps of:

receiving a request specifying at least two Web services;

storing a pattern object from the request in a common memory;

scanning the common memory with a plurality of watchers, wherein each watcher is associated with a Web service and specifies a rule for invoking an associated one of the Web services;

determining that the pattern object matches a rule of at least two of the watchers, such that each watcher having a rule matching the pattern object invokes an associated one of the Web services;

storing a list of watchers that invoke an associated one of the Web services and the pattern object in a cache, wherein the list of watchers is associated with the pattern object; and storing in the cache the new pattern object and a list of watchers that invoked Web services responsive to detecting the new pattern object.

3. A system for processing complex requests for Web services comprising:

a Hypertext Transfer Protocol server configured to receive a single request for more than one Web service;

at least one servlet configured to extract a pattern object from the request and to format a response to the request;

a common memory that temporarily stores the pattern object while the Web services specified by the pattern object execute;

a plurality of watchers, each watcher being associated with a particular Web service and including a rule for invoking the associated Web service, wherein each of said watchers scans said common memory in parallel to determine whether a stored pattern object matches a rule for invoking an associated one of the Web services;

a termination watcher configured to detect termination criterion, wherein the termination watcher provides the pattern object back to one of said plurality of servlets to generate a response upon detecting the termination criterion;

a cache for storing pattern objects from requests and lists of watchers that invoked Web services responsive to detecting the pattern objects from the past requests; and cache logic for comparing pattern objects from received requests with cached pattern objects, said cache logic causing each watcher in a list of watchers associated with a cached pattern object that matches the pattern object from a received request to invoke an associated Web service;

wherein said watchers scan said common memory in parallel such that more than one Web service can execute concurrently, wherein said watchers invoke more than one Web service sequentially, and wherein said watchers are further configured to modify the pattern object according to instructions provided from an associated one of the Web services.

* * * * *